June 18, 1968
L. C. JOHNSON
3,388,476
DIAMETRICAL DIMENSIONAL GAGE WITH
ROTATABLE CAMMING MEANS
Filed Aug. 5, 1966
2 Sheets—Sheet 2
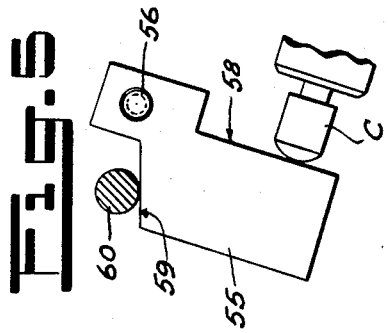
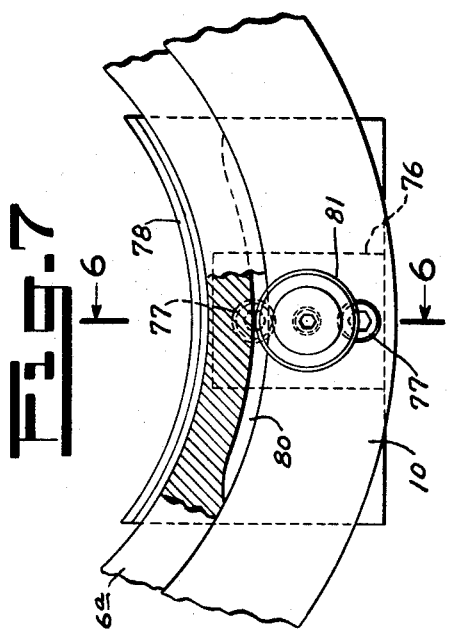
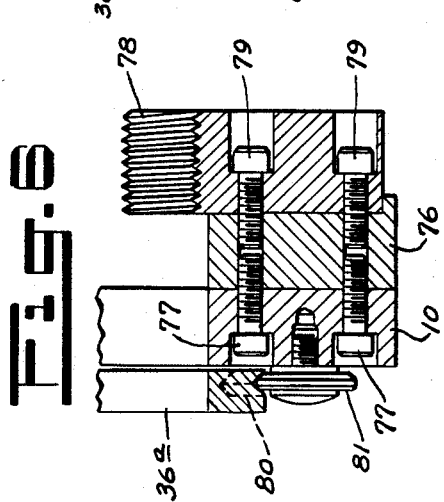
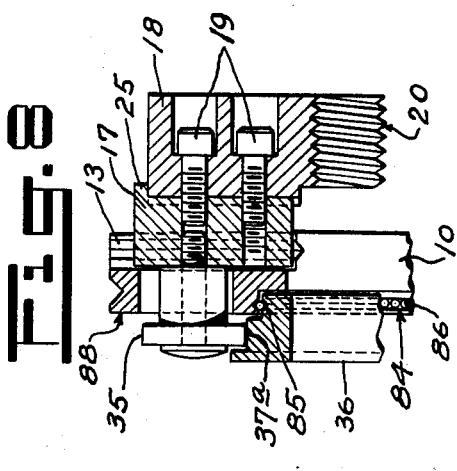
INVENTOR.
LOWELL C. JOHNSON
BY
John M. Montstream
ATTORNEY

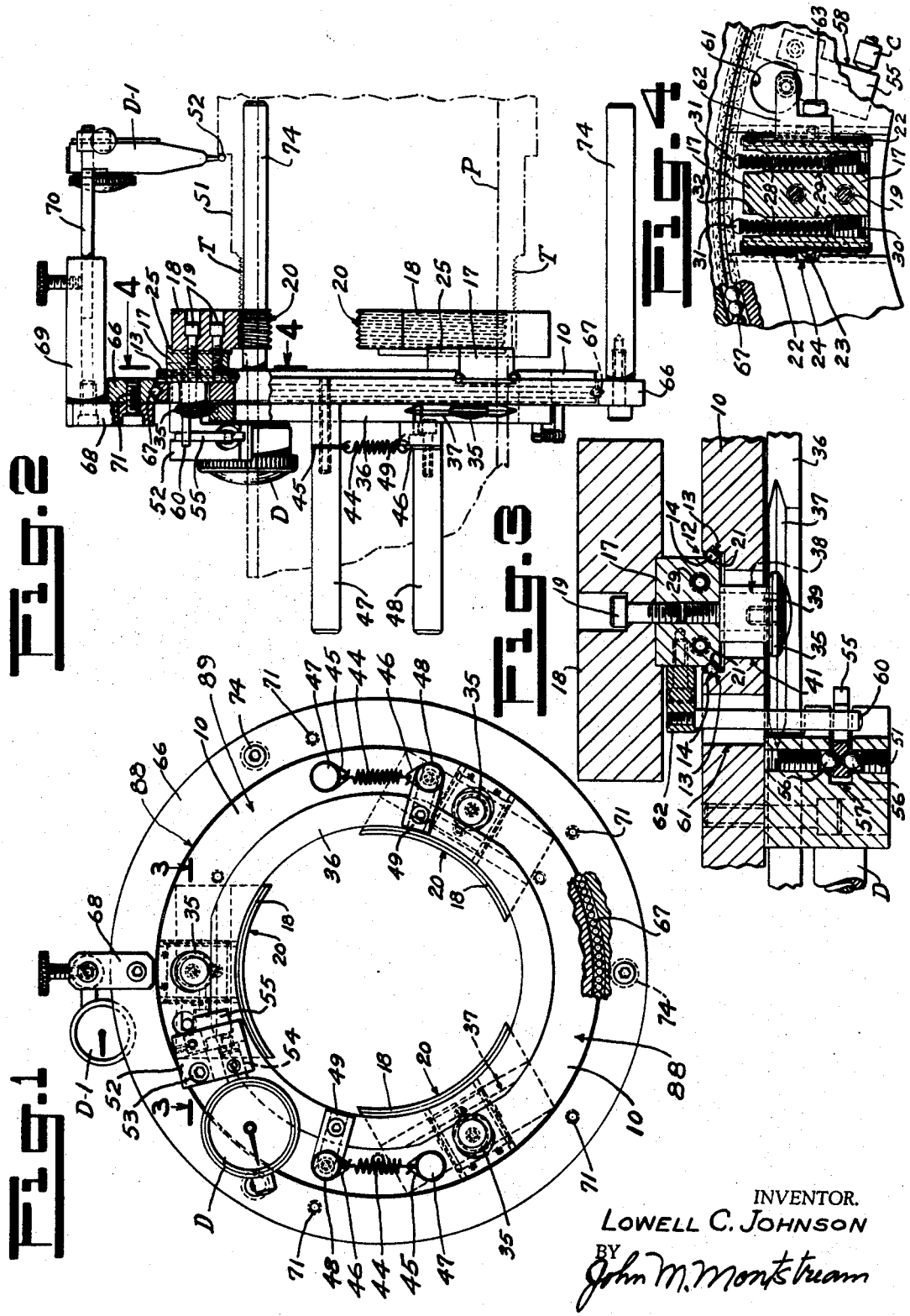

United States Patent Office 3,388,476
Patented June 18, 1968

3,388,476
DIAMETRICAL DIMENSIONAL GAGE WITH
ROTATABLE CAMMING MEANS
Lowell C. Johnson, Granby, Conn., assignor to Johnson
Gage Company, Bloomfield, Conn., a corporation of
Connecticut
Filed Aug. 5, 1966, Ser. No. 570,595
12 Claims. (Cl. 33—178)

ABSTRACT OF THE DISCLOSURE

The diametrical dimensional gage described includes a ring frame having gaging elements which are propelled radially by spring means. For an external gage, the gaging surface of the gaging element projects inwardly beyond the inner dimension of any gage part. A circular cam ring has a cam surface for each gaging element which cam surface propels its element radially so that the gage can be moved axially with respect to the test part or surface and upon release of the cam ring, each gaging element moves radially into contact with the test surface. The gage preferably includes a rotatable ring mounted on the ring frame which ring carries one or more indicators to test the centricity and/or squareness of another surface or surfaces with respect to the cylindrical surface of the test part. The cam ring is mounted for rotation on the gaging elements or a part thereof.

---

The invention is directed to a dimensional gage for determining whether or not a peripheral surface of a test part is within the allowable tolerances and is particularly suited for determining the accuracy of a large diameter screw thread and also a large diameter thread on a long part. In the turning or milling of a screw thread, it is very desirable and particularly for a long part such as a shaft, to measure the thread without removing the same from the centers or other mounting means on which the test part is mounted on the machine. This entails a gage that is as light in weight as possible as well as accurate. On a work piece mounted between centers, the gage is carried at or over the tail center or end mounting means of the machine such that the gage merely needs to be moved axially over the test part to the screw thread or surface to be gaged without removing the part from its mounting means on the machine.

It is an object of the invention to construct a gage primarily for large diameter parts which can be used without removing the test part from the mounting means supporting the test part on the machine which machine is turning or milling the test surface or thread.

Another object of the invention is to construct a gage for large diameter test parts which includes a ring frame having a hole completely therethrough so that the gage may be moved over the test part and an operating cam ring having a comparable hole which ring is turnably mounted relatively to the ring frame to radially expand the radially movable gaging means of the gage for positioning of the gage in gaging position over the surface to be gaged after which the cam ring is moved in a reverse direction whereby the gaging means are moved into contact with the surface or thread to be gaged.

A further object of the invention is to construct a gage as in the preceding paragraph in which the cam ring is supported for rotative movement on the gaging means.

Another objective is as above with a plurality of radially movable gaging means and having a centricity ring rotatably mounted on the ring frame for carrying indicator mounting means for an indicator or indicators which tests another surface or surfaces on the test part for either centricity or squareness or both with respect to the thread.

Other objects of the invention will be more apparent from the following description when taken in connection with the accompanying drawings illustrating a preferred embodiment thereof in which:

FIG. 1 is a front view of the gage.

FIG. 2 is a side view of the gage.

FIG. 3 is a full sided view of a portion of the mounting means for mounting the gaging means for radial movement.

FIG. 4 is a full sized view through the slide of the gaging means illustrating the spring means for propelling the gaging means radially inwardly.

FIG. 5 is an enlarged view of a motion transfer lever.

FIG. 6 is a partial sectional view showing a gaging means which is fixed to the ring frame.

FIG. 7 is a partial view of the gage from the cam side showing the cam ring at a fixed gaging means.

FIG. 8 is a partial sectional view of a cam ring rotatably mounted on the ring frame.

The gage herein has particular application to a screw thread of large diameter, such as is carried by the shaft of a jet engine, or compressor and the like, which thread is several inches in diameter and the shaft may be several feet long. This shaft is an expensive part to manufacture with the result that careful control of the machining of a screw thread thereon is of great importance and this means that this thread should be gaged relatively frequently and without requiring the removal of the shaft from the mounting means on the machine which is turning or milling the thread thereon. This entails, too, that the gage use a minimum amount of metal since the gage is necessarily large and should be able to be handled with a minimum of physical effort in moving the gage over the test part to gage the diameter of the surface or thread of the test part which has been machined or turned. It is intended that the gage be hung on the machine such as on or adjacent to the tail piece of the machine and circling the tail center or the test part.

The gage includes a ring frame 10 having a hole extending completely therethrough and of such diameter so that it will pass over the test part P from the end thereof to the surface being machined or thread T and which surface it is desired to be gaged with the test part remaining in the machine. The ring frame carries at least one guide 12, a plurality or particularly three being shown in the figures, each extending radially and uniformly spaced from each other circumferentially. The guides are shown particularly as carried by an end face of the ring frame and particularly shown as a groove therein extending radially and having side edges. Each guide side edge may carry a ball bearing V groove 13 for ball bearings 14 to support a gaging means for radial movement in each guide. Two or more radially extending guides may be used although three such guides is the usual construction.

Each gaging means is mounted on its guide for radial movement thereon. Each gaging means may be a two part means including a slide 17 and a gaging element 18 secured to the slide by screws 19. Each gaging element has a gaging surface 20 shown as of arcuate form and for a screw thread the surface would have gaging ridges. The slide has side edges in each of which there is a cooperating V ball groove 21. Oversized balls are pressed into the space between the cooperating V grooves on each side so that the gaging means or slide is supported against any shake. Preferably, the balls are provided with a ball retainer 22 and this ball retainer has a tongue 23 which normally passes through the space between the guide and the slide until the tongue thereof is centrally located whereupon the tongue is bent into a notch 24 centrally of the guide or slide to retain the retainer and the balls in position for movement with the slide. The notch is of greater length than the width of the tongue on the ball retainer so that the retainer may have freedom of movement over the length of radial movement of the gaging means. Preferably, the slide has a stop shoulder 25 against which the gaging element abuts. The gaging elements may be replaced with other elements for another size, pitch or form of thread.

Suitable spring means is provided to propel the gaging means or the slide radially inwardly. A spring 28 is provided in each of a pair of spaced holes 29 carried by the slide, one end of each hole having a screw 30 therein for adjusment of the compression of the spring therein. A spring abutment 31 is carried by the ring frame for each spring against which the other end of the spring presses to propel the gaging means radially inwardly. The slide carries a slot 32 at the upper end thereof extending into the spring hole in which slot the abutment is received.

Operating means is provided to simultaneously move each of the movable gaging means radially outwardly for insertion of the gaging means on the surface or thread of the test part to be gaged. This means includes a cam element 35 carried by each gaging means which engages a cam ring 36 suitably supported for rotary movement with respect to the ring frame. The cam ring carries a cam surface 37 for each gaging means which cam surfaces propel the gaging means radially outwardly upon relative rotation thereof with respect to the ring frame. The cam element carried by the gaging means particularly illustrated includes a known eccentric stud 38 secured to the inner face of the slide on which is carried a camming roll 39 which is rotatably mounted on the stud. The eccentric stud enables each of the gaging means to be adjusted radially with respect to each other and so that the gaging surface 20 of each gaging means will be coaxial with the axis of the ring frame. The test surface or screw thread, when the gaging means are in engagement with the test surface, has its axis coaxial with the axis of the ring frame. The camming roll carries a cam element 35 in the form of a camming ridge of a suitable form, that shown being generally a V form. The camming surface 37 of the cam ring is a cam groove shown as of V form, which receives the ridge 35 on the cam roll. The camming surface 37 particularly shown is provided by a flat in the periphery of the cam ring and a straight V groove along the flat surface. It will be noted, therefore, that in the construction particularly illustrated, the cam ring 36 is supported by the cam elements or particularly rolls 35.

It is clear that it is immaterial which of the parts including the cam ring and the gaging means, or particularly the camming roll, carries the cam groove and the other part carries the cam ridge for engaging the camming surface on the cam ring. In either case, the cam ring is supported by the cam elements or rolls or by the gaging means which dispenses with separate mounting means for the cam ring on the ring frame. It is convenient to have the cam ring on the opposite side of the ring frame from the guides and the gaging means. The ring frame is provided, therefore, with enlarged holes 41 through which the studs and the cam element 35, 38, 39, or cam roll projects. This hole is large enough to permit radial movement of the stud and roll when the gaging means are expanded for positioning of the gage over the surface to be gaged on the test part. It is clear, too, that the camming element carried by each gaging means in engagement with the cam ring need not be a roll 35, although a roll minimizes wear between the parts.

The cam ring is provided with spring means to propel the same in a direction away from the minimum diametrical position of the cam surface so that each cam roll 35 remains in contact with its cam surface. This spring means includes a pair of springs 44 having one end secured to an anchor 45 attached to the cam ring and the other end is secured to an anchor 46 attached to the ring frame.

This cam ring spring means is light enough in pressure so that it does not overcome the contracting pressures of the slide springs 28. The cam ring may be turned with respect to the ring frame by handle means including a pair of handles 47 secured to the ring frame and a pair of second handles 48 secured to the cam ring, such as by a handle bracket 49. The two handles are spaced apart so that squeezing the handles together turns the cam ring relatively to the ring frame and propels the gaging means radially outwardly for axially positioning of the gaging surfaces 20 over the test thread T. Conveniently each anchor 45 and 46 is attached to a handle.

Indicator mounting means is provided for an indicator D to indicate the position of one of the movable gaging means. The indicator mounting means is primarily an indicator bracket 52 secured to the ring frame by a screw 53. This bracket has a hole or socket 54 to receive the stem of the indicator. The bracket also mounts a motion transfered lever 55 which is pivotally mounted on the bracket on a pivot 56 and shown as mounted in a slot 57. The pivot bearing 56 uses a pair of balls each engaging a conical surface on opposite sides of the lever with the end of a screw 51 engaging each ball to assure mounting of the lever without shake. The motion transfer leverd has a surface 58 which engages the contractor C of the indicator D and a second surface 59 for engagement by a lever operator shown as a pin 60 which passes through a hole 61 in the ring frame and is carried by a pin bracket 62 which is secured to one of the gaging means by a screw 63. The lever pin engages the lever at a distance of one unit from the pivot and the contactor C of the indicator engages the lever at a distance of two units from the lever pivot for a two-to-one motion ratio so that the dial on the indicator may be a standard dial and give a direct reading of the diameter of the test part.

The test part having a screw thread of large diameter frequently has a surface, such as S1, which must be concentric with the axis of the thread T. Again there may be a surface, such as S2, which must be square with respect to the axis of the thread T. The gage carries an outer ring 66 rotatably mounted on the periphery of the ring frame. The mounting means 67 for the outer ring includes a ball groove in the periphery of the ring frame and a ball groove in the inner surface of the outer ring. Oversize balls within the grooves supports the outer ring on the ring frame without shake. This outer ring carries one or more indicator brackets 68 which may include a sleeve 69 and an extension pin 70 upon which may be mounted an indicator D1. The contactor of this indicator is shown as engaging the surface S2 to test the squareness thereof with respect to the axis of the thread T. This outer ring also may carry a second indicator bracket and indicator for testing the centricity of the peripheral surface S1 with respect to the axis of the thread. The outer ring is provided with a plurality of holes 71 located circumferentially thereof so that other indicator brackets may be mounted thereon for testing other surfaces for centricity or squareness or both. When the gage is mounted on the test surface, the axis of the ring frame and hence the axis of the outer ring bearing 67 is coaxial with the axis of the test surface or thead. The eccentric studs 38 enable the axis of the gaging surfaces to be adjusted coaxial with the mounting means 67 of the outer ring and with each of the other gaging surfaces.

It will be observed that the minimum diameter of the gage is the dimension of the gaging surfaces 20 of the gaging means. It is this construction which enables the gage to be passed over the test part to the surface or thread to be gaged. The gage may also be provided with attachable legs 74 carried by the outer ring 68 so that the gage may be located on a bench with the axis of the gage in a vertical position for testing the thread of a test part of relatively short length and to test other surfaces as to their centricity and/or squareness with respect to the axis of the thread. With the legs carried by the outer ring, the thread gaging means 17, 18, will grip the test thread and support the test part for rotation of the gaging means and the test part on the ball bearing means 67 and the centricity and/or squareness indicator D1 remain in fixed position. The surfaces such as S1 and S2 would rotate so that these surfaces may be gaged for centricity and squareness. When an outer ring 66 is provided on the gage, it is inconvenient to connect the indicator D with the gaging means 17, 18 through the cam element 35 to secure a reading as to the position of the gaging means, then the operating connection between one of the gaging means and the motion transfer lever 55 must be through a hole 61 in the ring frame 10.

The gage particularly described is designed so that a test may be made as to the squareness and/or centricity of another surface or surfaces of the test part with respect to the thread T or peripheral surface. A gage capable of a centricity test requires that all of the gaging means have radial movement so that the axis of the gage or the ring frame bearing 67 is positioned co-axial with the axis of the gaging surfaces or thread. If the test desired is merely to determine whether or not the test thread is within allowable tolerances, then solely one of the gaging means need move radially. Such a gage will provide one radially movable gaging means and the cooperating gaging means is or are fixed to the ring frame. Such a gage is less expensive to manufacture since one gaging means solely need be provided with guide means on the ring frame and with a slide for the gaging means for radial movement. In a gage having fixed cooperating gaging means cooperating with a radially movable gaging means, if this form of the gage has a single cooperating gaging means diametrically opposite from the radially movable gaging means, a one-to-one leverage ratio in the lever 55 will give a direct reading of the diameter of the test surface with a standard indicator dial. If, however, the gage includes three circumferentially spaced gaging elements with two of them fixed to the ring frame to form cooperating gaging means, in that event the leverage ratio should be .866 since the two fixed gaging elements do not engage across a diameter of the test surface. A leverage ratio of this value will then give a direct reading of the diameter of the test part. This gage may be constructed with an outer ring, however, it is suitable for testing the squareness of a surface S2 with respect to the thread since, for this test it is not necessary that the axis of the bearing 67 be coaxial with the axis of the gaging surfaces.

Since one gaging means solely is radially movable, the cam ring need have but one camming surface 37 and the cam ring may be similarly supported or may be otherwise suitably supported for rotation of the cam ring with respect to the ring frame. When the sole dimension to be gaged is the diameter of the peripheral surface or thread T, then it is not necessary that the cooperating gaging means be mounted for radial movement. In such a gage, the cooperating gaging means are fixed to the ring frame as illustrated in FIG. 6.

In this construction, the gaging means comprises a mounting block 76 secured to the ring frame 10 by screws 77 and the gaging element 78 is secured to the mounting block such as by screws 79. Since the cooperating gaging means are fixed, the cam ring 36a has a circular groove 80 in which is received a mounting roll 81 so that the camming ring is rotatably mounted with respect to the ring frame. These fixed gaging means are simpler to manufacture than the gage in which all of the gaging means are radially movable and hence results in a gage less costly to manufacture. In a gage having two cooperating gaging means which are fixed, the leverage ratio on the motion transfer lever 55 should be .866 since the gaging elements do not support the test part across a diameter.

It is not necessary where the gaging means have an arcuate or segmental gaging surface 20 that three circumferentially disposed gaging means be provided. In a gage having two gaging means which slide radially, the gaging ratio for the motion transfer lever 55 remains two-to-one as described. In a gage comprising one fixed gaging element with arcuate gaging surface and one radially movable gaging element with arcuate gaging surface, the movement of the radially movable gaging means will be across a diameter and in this construction, the ratio in the motion transfer lever 55 should be one-to-one.

The cam surfaces or grooves 37 will have a minimum diameter at their midpoint in the form shown such that the gaging surfaces 20 may contract to the minimum allowable tolerance for the test part with some additional ability to contract. The eccentric studs 38 enable adjustment of the position of each gaging surface with respect to the cam surface 37 which propels the gaging means radially.

FIG. 8 shows a modification of the cam ring structure in which the cam ring is rotatably mounted on the ring frame by a cam ring bearing. This construction assures that there will be no shake in the cam ring and hence the ring frame is centralized on the thread. It also enables a flat surface 37a to be used as the camming surface rather than the V groove shown in the construction of FIGS. 1 through 7. The cam ring bearing particularly shown in an inner circular V groove 84 around an inner periphery of the ring frame and a cooperating circular V groove 85 carried by the camming ring. Over-sized balls 86 are pressed into the cooperating V grooves which gives full freedom for circular movement of the cam ring without shake. Each flat camming surface is engaged by its cam engaging roll 35 to expand the radially movable gaging means for insertion of the gaging elements on the test surface or thread. This construction gives free turning of the cam ring under the contracting pressure of the slide contracting spring means 28.

In assembling the gage, it is essential that the pressures of the springs 28 propelling each of the radially movable gaging means inwardly be closely uniform. This is accomplished by measuring the pressure upon each gaging element and adjusting the compression of the springs through the adjusting screws 30. It is difficult to secure equal pressure but the pressure is adjusted so that the difference between the spring pressures on each gaging means is in ounces.

The tension of the spring means 44 is also important since it maintains or assures the centricity of the frame with respect to the gaging surfaces and the test thread which is important for an accurate indicator reading for diameter and also when the gage is constructed with an outer ring 66 for gaging for centricity and/or squareness of other surfaces of the test part with respect to the test thread, or when constructed to gage the test thread for centricity and/or squareness between centers as well appear hereinafter. In order to assure uniform contact of the rolls on the cam surface of the cam ring, the pressure of the spring means 44 should be not less than equal to the difference between the slide having maximum and the slide having minimum pressure at gaging position. The spring pressure of this spring means should not approach a value which would overcome the combined spring pressure of the slide springs 28.

In order to assure accuracy in the indicator, it is necessary too that the pivot bearing for the motion transfer lever 55 has no bearing shake. Various mountings may be used to assure that there will be no shake in the mounting of this lever on the indicator bracket. The bearing shown includes a conical countersink on each side of the lever and a ball 56 resting in each cone backed up by adjusting screw 51.

In a gage having an outer ring 66, it is essential that the V groove in the outer periphery of the ring frame which receives the balls 67 be concentric to the gage assembly or axis and that this groove also be square or in a plane which is square to the axis of the gage or the gaging surfaces 20. For a gage which may not have an outer ring 66, it is important that a peripherial surface on the frame, such is the outer periphery 88, be concentric to the gaging surfaces or gage axis. The reason for this is that when the gage is to be used on a test part which is mounted between centers, such as a lathe, thread miller, thread grinder and the like, a test for centricity of the thread may be made by turning the test part on the centers and apply an indicator to this surface. Such indicator may be carried on the usual indicator stand or bracket and the bracket held on or resting on a way or bed of the machine. Again one of the side surfaces or faces, such as face 89, of the gage frame should be square with respect to the axis of the gage or the axis of the gaging surfaces 20 so that the indicator may be applied to this squared surface in the same way. This ring frame preferably would be of greater diameter to extend the face 88 beyond the indicator bracket. As indicator applied to this squared face or surface when the test part is rotated will indicate the squareness of the thread with respect to the axis of the test part between centers or whether or not there is any angularity between the axis of the test thread and the axis of the part. The centricity means for the gage may take the form of a centric and/or squared surface on the ring frame or may be the outer ring 66 which means to carry one or more indicators.

The cam ring 36 serves two functions in the gage namely, to radially expand the gaging means and to centralize the ring frame with respect to the gaging surfaces and hence the test thread by compensating for any difference in pressures exerted by the spring means 28 for the gaging means.

This invention is presented to fill a need for improvements in a Diametrical Dimensional Gage With Rotatable Camming Means. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A gage for a test part comprising a ring frame having a substantial opening completely therethrough and having an inner periphery larger in diameter than the test part to pass the frame thereover, at least one guide means carried by the ring frame and extending radially; a plurality of gaging means carried by the ring frame including a first gaging means for said guide means and mounted on the latter for radial movement, and cooperating gaging means circumferentially spaced from the first gaging means; each gaging means having a gaging surface located radially inwardly of the inner periphery of the opening through the ring frame, a cam element carried by said radially movable gaging means, spring means for said radially movable gaging means extending between the ring frame and the gaging means to propel the gaging means radially inwardly, a cam ring having an inner diameter greater than that of the gaging surfaces of the gaging means, mounting means for the cam ring to rotatably support the same with respect to the ring frame including a camming surface for said radially movable gaging means carried by the cam ring on an outer peripheral surface, said cam element engaging a camming surface to propel said radially movable gaging means outwardly upon rotative movement of the cam ring with respect to the ring frame, and indicator mounting means carried by the ring frame adapted to receive an indicator located to be responsive to the radial position of a radially movable gaging means.

2. A gage as in claim 1 including guide means for said cooperating gaging means extending radially and receiving said cooperating gaging means for radial movement, the pressure of the spring means for each gaging means being closely equalized, spring means between the ring frame and the cam ring to turn the cam ring in a direction towards the maximum diameter of the cam surfaces with respect to the cam element, and the cam ring spring means having a tension at least equal to the difference in the maximum and minimum pressures of the gaging means spring means.

3. A gage as in claim 2 in which one of parts including the camming element and the camming surface is a groove and the other is shaped to engage in the groove to rotatably support the cam ring.

4. A gage as in claim 2 in which the ring frame has opposite faces, the guide means is carried on one face of the ring frame and the indicator mounting means is carried on the opposite face of the ring frame from the guide means, an indicator lever pivotally mounted on the mounting means, and an operating connection between a radially slidable gaging means and the indicator lever.

5. A gage as in claim 4 including an outer ring rotatably mounted on the ring frame, at least one indicator mounting means carried by the outer ring, and an opening through the ring frame through which the operating connection extends.

6. A gage as in claim 5 in which the camming element includes means to adjust the radial position of the camming element upon the slidable gaging means.

7. A gage as in claim 5 in which the camming element is a roll, and the adjusting means for the camming element is an eccentric stud on which the latter is rotatively mounted.

8. A gage as in claim 1 in which the cam ring has a flat in the periphery thereof for each movable gaging means, and the camming surface is a groove in the flat.

9. A gage as in claim 1 in which the cooperating gaging means is fixed to the ring frame, and the cam ring mounting means includes means carried by the ring frame circumferentially spaced from the camming element and engaging the cam ring and cooperating with the camming element to mount the cam ring for circular movement.

10. A gage as in claim 9 including an outer ring, bearing means rotatably mounting the outer ring on the ring frame which bearing means is coaxial within a plane which is square with respect to the gaging surfaces, and at least one indicator mounting means carried by the outer ring.

11. A gage as in claim 2 in which the cam ring mounting means includes a bearing carried by the ring frame and the cam ring to rotatably mount the latter on the frame, and the camming surfaces being flat surfaces, and 12. A gage as in claim 11 including centricity means carried by the ring frame which is centric and/or squared with respect to the gage axis.

References Cited

UNITED STATES PATENTS

| | | | |
|---|---|---|---|
| 2,419,263 | 4/1947 | Hohwart | 33—199 |
| 2,586,114 | 2/1952 | Swanson | 33—199 |
| 3,052,035 | 9/1962 | Shuster | 33—199 |

SAMUEL S. MATTHEWS, *Primary Examiner*.